UNITED STATES PATENT OFFICE.

FRANCIS R. EDEN, OF MONTCLAIR, NEW JERSEY.

PROCESS FOR TREATING COFFEE.

1,216,671.  Specification of Letters Patent.  Patented Feb. 20, 1917.

No Drawing.   Application filed October 30, 1915.  Serial No. 58,796.

*To all whom it may concern:*

Be it known that I, FRANCIS R. EDEN, a citizen of the United States, residing in the town of Montclair, county of Essex, and State of New Jersey, have invented certain new and useful Improvements in Processes for Treating Coffee, of which the following is a specification.

My invention relates to an improved process for the treatment of green coffee beans whereby the caffein is extracted therefrom and the remaining constituents of the bean are left unimpaired therein.

The objects of my invention are the production of a roasted coffee bean from which the caffein has been removed without the removal of the aromatic essentials therefrom, the preservation of the essential oil and the formation of empyreumatic oil in increased quantity, and to attain these results without the use of chemicals.

My process is a physical one, involving the expansion of the organic structure of the bean by moisture and heat, including the absorption of the moisture by the structural cells, and particularly by the innermost layer thereof, in which the caffein of the bean is localized; the extraction of the moisture, aided by the contraction of the bean in forcing it out, together with the liberated caffein in solution therewith resulting from the partial decomposition of these cells; and the further extraction of the remaining caffein by repetition of the foregoing step supplemented by mechanical withdrawal of the moisture effected by a centrifugal machine, and the immediate application to the bean of roasting heat at a temperature in excess of the normal roasting temperature for the same grade of untreated bean, whereby there is induced in the still moist interior of the bean the sublimation of the remaining caffein and the formation of steam or vapor, which, acting throughout the cellular structure of the bean, drives the essential oil to the surface; the formation of empyreumatic oil upon the surface, and the abrupt withdrawal of heat before volatilization of the aromatic oils has materially progressed.

As coffee beans readily imbibe exhalations from other bodies and thereby acquire adventitious and disagreeable flavors, the use of chemical solvents of caffein renders the production of a decaffeinated coffee bean whose natural flavor is unimpaired a practical impossibility; nor can the essential oil or other aromatic substances of the bean be restored thereto without impairment. In consequence of these objections it is found that high grade coffees chemically treated do not retain the same aroma or flavor and become less valuable after decaffeination, but by my improved process a low grade of coffee, after decaffeination, is rendered more valuable, its aromatic properties and its flavor being retained and developed thereby.

The best method now known to me and the manner in which such method is applied to attain the objects of my invention, are as follows: Green coffee beans are immersed in water at a temperature of from 200° Fahrenheit to 212°, the temperature varying with, and also the period of immersion depending upon, the grade of the coffee to be treated as well as the condition of the bean, its age, hardness, and the caffein-content, which may be between .6 and 2.2%. The beans remain immersed for a period varying, for the reasons above given, from fifteen to twenty minutes, during which time the beans expand and partly unfold, absorbing water into their interior cells until they are saturated. This condition will be indicated by an increase in their volume of approximately 50%, and an increase in weight of from 20 to 25%.

The beans are then removed from the water and allowed to steam, drain and contract for a period of about five minutes, when the operation of immersion is repeated.

These immersions in water of the temperature named result in a forced tendency to germination, which in many instances will be evidenced by the actual rupture of the outer wall of the bean. This tendency to limited germination induces the liberation of the caffein contained in the interior cellular layer of the bean from which the sprout forms, and as caffein is soluble in hot water it is given up by the bean and passes off with the water of solution to such an extent that by the repetition of the immersion step, as above described, the bean loses approximately 95% of its contained caffein. The contraction of the bean by the cooling resultant from its withdrawal from the hot baths materially assists in the exuding of the caffein.

It is to be understood that these immersion steps are only maintained long enough to soften and expand the beans, and not long enough to extract any of the fatty substances or aromatic oils, which, being slower of solution, and non-water-soluble, are retained by the bean.

The coffee beans are next transferred while moist and steaming to the cylinder of a centrifugal extractor, where substantially all of the water remaining is removed and with it in solution nearly all of the last traces of caffein.

The fourth step in my process is the transfer of the beans from the centrifugal direct to a coffee roaster and their immediate roasting while still retaining interiorly such traces of moisture as have not been drawn off by the extractor. The immediate roasting of the beans in this condition is an essential step in my process, and this roasting must be done quickly, and with a higher heat than is ordinarily used for untreated beans; for example, untreated coffee, which requires roasting for from 35 to 40 minutes, must remain in the roaster for from 40 to 45 minutes when treated by the preceding steps of my process and with a heat higher than would otherwise be used. While untreated coffee loses from 14 to 16% in roasting, the coffee treated by the preceding steps of my process will lose substantially an equal amount. This is due to the fact that its weight is increased by the moisture absorbed and not driven off by the centrifugal; so that although its actual loss by the roasting step is from 20 to 24%, due to the driving off of the moisture, the net loss is substantially that of untreated coffee. While my treated coffee is in the roaster for a longer time than is usual for untreated coffee, the actual roasting takes place more quickly, as it does not begin until all the moisture has been driven off. This driving off of the moisture by the roaster I regard as an important feature of my improved process, since it involves driving to the surface, through the wall of the bean, all of the essential oils and fatty substances which are so valuable to the flavor of the coffee. This expulsion of these matters to the surface results from the moisture retained in the cells of the bean, and facilitates the formation of an increased percentage of empyreumatic oils. The roasting step is discontinued before the aromatic oils and substances are volatilized by heat.

As an example of the application of my process I have roasted No. 4 Santos coffee, equal to New York Coffee Exchange Type #4, crop 1915, known in the trade as peculiarly hard and therefore very undesirable as to cup quality. This coffee was soaked for 20 minutes at a temperature of 212° and drained for five minutes, again soaked at the same temperature for the same period, centrifuged for five minutes, and then roasted for 40 minutes.

The beverage made from this coffee loses the hard and bitter flavor characteristic of this quality of coffee and becomes so modified as to be equal in flavor and aroma to the most desirable quality coffee of this type.

Having thus described my invention and the best method now known to me of practising the same, I claim:

1. The described process for treatment of green coffee beans consisting in extracting the caffein therefrom by immersion in water at a temperature at which caffein is readily soluble, driving off the water from the beans, and roasting them while moist.

2. The step in the described process consisting in roasting decaffeinated coffee beans while moist.

3. The described process for treatment of green coffee beans consisting in roasting the beans from which the caffein has been withdrawn by the extractive action of water while moist.

4. The process of treatment of green coffee beans consisting in moistening said beans and roasting while moist.

5. The method of increasing the empyreumatic oil of coffee beans consisting in impregnating the cells of the green bean with moisture, vaporizing said moisture, and roasting whereby the essential oil is driven out by the expanding vapor.

6. The method of increasing the empyreumatic oil of roasted coffee consisting in impregnating the cells of the green bean with moisture, vaporizing said moisture, and roasting during the period that essential oil is driven to the surface but without volatilization thereof.

FRANCIS R. EDEN.